UNITED STATES PATENT OFFICE.

FRITZ ROTHE, OF DESSAU, GERMANY, ASSIGNOR TO ELEKTROCHEMISCHE WERKE, G. M. B. H., OF BITTERFELD, GERMANY.

PRODUCTION OF NITRITES.

1,070,070.   Specification of Letters Patent.   Patented Aug. 12, 1913.

No Drawing.   Application filed May 8, 1912.   Serial No. 695,806.

*To all whom it may concern:*

Be it known that I, FRITZ ROTHE, a subject of the King of Prussia, and resident of Dessau, Germany, 116 Albrechtstrasse, have invented certain new and useful Improvements in the Production of Nitrites; and I do hereby declare the following to be a full, clear, and exact description of the invention, such as will enable others skilled in the art to which it appertains to make and use the same.

It is well known that pure solutions of nitrites may be obtained by the introduction of nitrous gases which contain a slight excess of NO with respect to $NO_2$, into a concentrated solution of alkalis, carbonates of the alkalis, etc., in the absence of air; see Gmelin-Kraut *Handbuch der Anorganischen Chemie*, 7th ed. Vol. II, Part I, page 303. If, however, the nitrous gases contain air, the conditions of absorption are more complicated, as has been shown by Le Blanc (*Zeitschrift für Elektrochemie*, Vol. XII, pages 543, 544, year 1906), and in such cases, in addition to nitrites, nitrates are produced in considerable quantities.

Particularly, in the oxidation of nitrogen in the electric furnace such nitrous gases complicating the conditions are produced, inasmuch as it is not feasible to treat these gases with alkali at exactly the time when the oxidation of a portion of the NO to $NO_2$ has proceeded so far that there is at hand the molecular mixture of $NO+NO_2=N_2O_3$ necessary for the production of pure nitrites. German Patent No. 188188 proposes to avoid these difficulties by cooling down the nitrous gases produced in the electric furnace only to such a degree (300° C.) that at this temperature a further chemical combination of oxygen beyond the ratio $N_2:O_3$ shall not take place. Nevertheless, even the process of the German patent referred to does not completely remove the difficulties. In practice, where it is a question of obtaining as great a quantitative absorption of the nitrous gases as possible, and as complete a neutralization of the absorption medium as possible, there is always required a number of absorbers in communication with each other. The favorable conditions obtained in the process of the German patent referred to exist only in the first absorption apparatus, or in a portion of the first absorption apparatus, whereas further on, in consequence of further diminution of temperature, the composition of the gases constantly diminishes in favor of $NO_2$, and the formation of nitrate correspondingly increases; see Foerster & Blich, *Zeitschrift für Angewandte Chemie*, year 1910, page 2017.

By means of the present invention it is possible, in a simple manner, to convert nitrous gases with almost quantitative output into nitrites of a high grade of purity, in so far as nitrate salts are concerned.

The process consists in conveying to the absorption plant, the nitrous gases that are to be absorbed (for instance, the nitrous gases from the electric furnace) in two or more separate gas currents, converting a part of these gas currents by appropriate treatment (*e. g.*, cooling sufficient time of reaction, etc.) principally into $NO_2$, whereas for the other part, by maintaining suitable temperatures and providing the shortest possible path of travel from the electric furnace to the absorption apparatus, the formation of $NO_2$ is prevented, or any $NO_2$ present is reconverted into NO, whereupon the said gas currents, immediately before entering the absorbing medium, are so commingled that at every portion of the absorption system the ratio $NO:NO_2::1:1$ exists, or even in some cases, a slight excess of NO is present.

In order to realize the conditions for the formation of pure nitrite ($NO+NO_2=N_2O_3$), the gas containing NO should be mixed not merely at one place with the portion containing $NO_2$, but, corresponding to the progressive absorption, the gas containing NO should be introduced at different parts of the apparatus where the absorbers are connected up in series, for instance, in each individual absorber of the series in accordance with the quantity of $NO_2$ present therein; or, where a single large absorber is employed, at various places in said single large absorber. In carrying out the operation, it is desirable, at suitable parts of the absorption system, to work with a small excess of NO for the reason that by so doing, the formation of pure nitrite is assured.

In practice, the process has the great advantage that all of the nitrous gases can be converted into nitrite, whereas heretofore, the so-called residual gases given off from the nitrite absorption apparatus have only been recoverable by further absorption, by means of lime and the like, in the form of a less valuable mixture of nitrate and nitrite.

The following will serve as an example of the practice of the invention: If the nitrous gases coming, for instance, from an electric air combustion furnace, are first cooled and then introduced into alkali solutions, e. g., into soda-lye, there will be produced in the lye, mixtures of nitrite and nitrate, in which the ratio of the nitrite to the nitrate may vary within wide limits, and, under favorable conditions will show 90 per cent. nitrite. If now, only a portion of the gases is cooled, this being effected by giving said portion sufficient time to traverse a sufficient length of conducting pipes, all of the NO or $N_2O_3$ in said portion will be converted into $NO_2$ before entering the absorption apparatus. The other portion of the gas, which is cooled only to somewhat less than a dark red heat, is conducted along the shortest path of travel and enters the absorption apparatus through the same gas inlets which are provided for the first portion. The resulting lyes contain from 97 to 99 per cent. nitrite and 3 to 1 per cent. of nitrate. It will, of course, be understood that the process is likewise applicable to nitrous gases of other origin containing air or oxygen.

Having thus described my invention, what I claim is:

1. In the production of nitrites from nitrous gases containing air or oxygen by absorption in an alkaline medium, the method of increasing the quantitative yield of nitrites, which consists in subdividing the current of gases to be absorbed into separate gas currents on the way from the place of production to the absorbing medium, and so regulating the conditions of time and temperature in the respective subdivided gas currents that the nitrous constituents in one portion will be delivered into contact with the absorbing medium substantially as $NO_2$ and the nitrous constituents in the other portion will be delivered into the absorbing medium substantially as NO, the said gas currents being again commingled in such manner that at the moment of absorption a sufficient quantity of NO is present to satisfy the molecular ratio of $NO+NO_2=N_2O_3$; substantially as described.

2. In the production of nitrites from nitrous gases containing air or oxygen by absorption in an alkaline medium, the method of increasing the quantitative yield of nitrites, which consists in subdividing the current of gases to be absorbed into separate gas currents on the way from the place of production to the absorbing medium, and so regulating the conditions of time and temperature in the respective subdivided gas currents that the nitrous constituents in one portion will be delivered into contact with the absorbing medium substantially as $NO_2$ and the nitrous constituents in the other portion will be delivered into the absorbing medium substantially as NO, the said gas currents being again commingled in such manner that at the moment of absorption a sufficient quantity of NO is present to satisfy the molecular ratio of $NO+NO_2=N_2O_3$, and to be slightly in excess; substantially as described.

3. In the production of nitrites from the hot nitrous gases, containing air or oxygen, of an electric furnace, by absorption in an alkaline medium, the method of increasing the quantitative yield of nitrites, which consists in subdividing the hot gases into separate gas currents, converting the nitrous constituents present in one portion of said currents substantially into $NO_2$ by sufficiently cooling said portion and prolonging its period of travel from the furnace to the absorbing medium, maintaining a temperature in the other portion of said gas currents on its transit to the absorbing medium sufficient to deliver its nitrous constituents thereinto substantially as NO, and again commingling the gas currents in such manner that at the moment of absorption a molecular ratio of $NO+NO_2=N_2O_3$ is present throughout said medium; substantially as described.

In testimony whereof I affix my signature, in presence of two witnesses.

FRITZ ROTHE.

Witnesses:
  EDUARD HOPF,
  ERNEST H. L. MUMMENHOFF.